United States Patent
Morton et al.

(10) Patent No.: US 11,394,256 B2
(45) Date of Patent: Jul. 19, 2022

(54) SLOTLESS BRUSHLESS DC MOTOR / ACTUATOR

(71) Applicant: Magswitch Technology, Inc., Lafayette, CO (US)

(72) Inventors: David H. Morton, Boulder, CO (US); Michael H. Reed, Westminster, CO (US); Thomas R. Whitt, Golden, CO (US); Michael C. Blanchard, Thornton, CO (US)

(73) Assignee: Magswitch Technology Inc., Lafayette, CO (US)

( * ) Notice: Subject to any disclaimer, the term of this patent is extended or adjusted under 35 U.S.C. 154(b) by 35 days.

(21) Appl. No.: 16/779,078

(22) Filed: Jan. 31, 2020

(65) Prior Publication Data

US 2020/0169126 A1     May 28, 2020

Related U.S. Application Data

(63) Continuation of application No. 15/534,457, filed as application No. PCT/IB2015/058141 on Oct. 22, 2015, now Pat. No. 10,587,158.

(Continued)

(51) Int. Cl.
*H02K 1/18*     (2006.01)
*H02K 3/50*     (2006.01)
(Continued)

(52) U.S. Cl.
CPC ................ *H02K 1/18* (2013.01); *H02K 1/27* (2013.01); *H02K 1/2733* (2013.01); *H02K 3/04* (2013.01);
(Continued)

(58) Field of Classification Search
CPC .. H02K 1/12; H02K 1/18; H02K 1/27; H02K 1/2733; H02K 21/14; H02K 2201/03;
(Continued)

(56) References Cited

U.S. PATENT DOCUMENTS

| | | | | |
|---|---|---|---|---|
| 4,103,197 A | * | 7/1978 | Ikegami | ................... H01F 3/14 |
| | | | | 310/208 |
| 4,547,713 A | * | 10/1985 | Langley | ................. H02K 29/08 |
| | | | | 310/164 |

(Continued)

FOREIGN PATENT DOCUMENTS

| | | |
|---|---|---|
| CN | 1792021 A | 6/2006 |
| CN | 102593990 A | 7/2012 |

(Continued)

OTHER PUBLICATIONS

Machine translation of Kinemotion [KR 2004-0065521] (Year: 2004).*

(Continued)

*Primary Examiner* — Bernard Rojas
(74) *Attorney, Agent, or Firm* — Faegre Drinker Biddle & Reath LLP

(57) ABSTRACT

A torque delivering apparatus, including: polygonal cross-section stator body having a plurality of exterior side faces of even number extending between opposite axial end faces, the stator including cylindrical bore extending between the opposite axial ends and centred on central axis of the stator body; a rotor assembly having cylindrical cross-section sized for rotation within the cylindrical bore about the central axis with at least one permanent magnet and shaft coupled to the magnet for rotation; and a plurality of solenoid coils, each coil having plurality of windings and routed to have sections extending parallel along opposite ones of the plurality of exterior side faces; wherein each of the plurality of coils is configured to selectively receive (Continued)

current and generate magnetic field in the stator that is applied to the rotor magnet, the rotor being subject to magnetic torque within the cylindrical bore for rotating and aligning the magnetic field of the permanent magnet with the generated magnetic field.

7 Claims, 6 Drawing Sheets

Related U.S. Application Data

(60) Provisional application No. 62/067,600, filed on Oct. 23, 2014.

(51) Int. Cl.
| | | |
|---|---|---|
| *H02K 1/27* | (2022.01) | |
| *H02K 5/16* | (2006.01) | |
| *H02K 21/14* | (2006.01) | |
| *H02K 3/04* | (2006.01) | |
| *H02K 37/12* | (2006.01) | |
| *H02K 1/2733* | (2022.01) | |
| *H02K 3/46* | (2006.01) | |
| *H02K 1/12* | (2006.01) | |
| *H02K 26/00* | (2006.01) | |
| *H02K 5/15* | (2006.01) | |
| *H02K 37/14* | (2006.01) | |
| *H02K 7/00* | (2006.01) | |

(52) U.S. Cl.
CPC .............. *H02K 3/50* (2013.01); *H02K 5/161* (2013.01); *H02K 21/14* (2013.01); *H02K 37/12* (2013.01); *H02K 1/12* (2013.01); *H02K 3/46* (2013.01); *H02K 5/15* (2013.01); *H02K 7/003* (2013.01); *H02K 26/00* (2013.01); *H02K 37/14* (2013.01); *H02K 2201/03* (2013.01)

(58) Field of Classification Search
CPC ........ H02K 26/00; H02K 37/12; H02K 37/14; H02K 3/04; H02K 3/46; H02K 3/50; H02K 5/15; H02K 5/161; H02K 7/003
See application file for complete search history.

(56) References Cited

U.S. PATENT DOCUMENTS

| | | |
|---|---|---|
| 4,642,502 A | 2/1987 | Carpenter et al. |
| 4,754,178 A | 6/1988 | Kavanaugh |
| 5,327,032 A | 7/1994 | Esswein |
| 5,365,137 A | 11/1994 | Richardson et al. |
| 2007/0138897 A1 | 6/2007 | Asaba et al. |
| 2011/0140563 A1 | 6/2011 | Beranger |
| 2013/0002053 A1* | 1/2013 | Stadnik ................ H02K 1/22 310/12.26 |
| 2013/0082560 A1* | 4/2013 | Takeuchi ............... B60L 50/20 310/156.01 |
| 2014/0125191 A1 | 5/2014 | Lin |
| 2015/0108878 A1 | 4/2015 | Rodger et al. |
| 2015/0288241 A1 | 10/2015 | Mahler |
| 2017/0358962 A1 | 12/2017 | Morton et al. |

FOREIGN PATENT DOCUMENTS

| | | |
|---|---|---|
| DE | 102012223976 A1 | 6/2014 |
| GB | 1199509 A | 7/1970 |
| JP | 61-227647 A | 10/1986 |
| KR | 20-0284488 | 7/2002 |
| KR | 10-0367478 B1 | 1/2003 |
| KR | 10-2004-0065521 A | 7/2004 |
| KR | 10-0570360 B1 | 4/2006 |
| WO | 2009/000599 A1 | 12/2008 |
| WO | 2009/140750 A2 | 11/2009 |

OTHER PUBLICATIONS

Communication Pursuant to Article 94(3) EPC issued by the European Patent Office, dated Sep. 30, 2019, for European Patent Application No. 15852127.8; 9 pages.
Extended European Search Report, EP15852127.8 to Magswitch Technology Inc., European Patent Office, dated Aug. 24, 2018, 11 pages.
International Preliminary Report on Patentability received for PCT Patent Application No. PCT/IB2015/058141, dated Sep. 19, 2016, 3 pages.
International Search Report and Written Opinion received for PCT Patent Application No. PCT/IB2015/056141, dated Nov. 16, 2015, 10 pages.

* cited by examiner

SLOTLESS BRUSHLESS DC MOTOR / ACTUATOR

CROSS-REFERENCE TO RELATED APPLICATIONS

The present application is a continuation of U.S. Non-Provisional application Ser. No. 15/534,457 filed Jun. 8, 2017, which is a 371 U.S. National Phase Patent Application based on International Application No. PCT/IB2015/058141, filed Oct. 22, 2015, which claims the benefit of U.S. Provisional Patent Application No. 62/067,600, filed Oct. 23, 2014, the entire disclosures of which are hereby expressly incorporated herein by reference.

FIELD OF THE INVENTION

The present disclosure relates generally DC motors/actuators and more particularly to slotless brushless DC motors/actuators having coils wound outside and along opposing sides of a stator in which a rotor is received.

BACKGROUND TO THE INVENTION

Brushless DC ("BLDC") motors are known. They include, among other things, a stator and a rotor. The stator is typically made from laminated steel stampings which are stacked to form a cylindrical shape with a central opening for receiving the rotor. The steel laminations in the stator may be slotted or slotless. A slotless stator has lower inductance and can therefore run at very high speeds. The absence of "teeth" that form the slots permit reduced requirements for the cogging torque, thereby making slotless BLDC motors appropriate for low speed use as well. Slotless BLDC motors may be more expensive than slotted BLDC motors, however, because more windings may be necessary to compensate for the larger air gap between the rotor and stator.

More specifically, many existing slotless motor designs include an outer casing or housing, a stator, a rotor assembled in some fashion with permanent magnets, axially fixed relative to the casing and stator so as to be rotatable within the central opening or bore of the stator, and windings provided with the stator, which energize and magnetize the stator in order to apply a torque to the permanent magnet members affixed to or comprising the rotor. The stator may consist of a hollow steel cylinder, constructed of a solid iron core, steel laminations with a circular cross-section stacked to make a cylinder (as indicated above), or concentric rings of amorphous ferroalloy tape assembled by rolling or successive layering. The windings responsible for the drive and magnetization of the stator are then typically wound onto the stator in one of two ways. In the first approach, the stator is constructed to have external protrusions which serve as arms around which a coil may be wound, placed at a specified series of angular positions around the exterior of the stator. In another approach, the stator is a plain cylinder, with no exterior or internal features beyond those required for interfacing the stator to other components. The windings are attached directly to the inner bore of the stator using a bobbin or adhesive.

Such slotless motors eliminate the preferential magnetic circuits present in normal slotted, armature-wound motors, and the cogging torques and slot losses typically found in permanent-magnet-rotor based motors. In theory, slotless motors should be able to achieve higher efficiencies over a greater range of operational conditions vs. a typical slotted stator motor design. Moreover, the simplified stator leads to much simpler, and therefore cheaper, manufacturing of the motor. The simplification of the field coil winding process also improves manufacturability.

Notwithstanding the foregoing advantages of slotless motors, conventional designs are still in need of improvement. The external protrusion design is effective, but creates some preferential magnetization directions through the diameter of the cylinder, which creates some "slot losses" and cogging torque. These designs also increase manufacturing difficulty by adding armatures of a sort back into the manufacturing and assembly process, negating many of the manufacturing benefits of slotless motors.

However, this design does have the advantage of allowing a very close tolerance within the bore, minimizing the air gap between the stator and rotor, maximizing the efficiency of the slotless motor design and giving such motors a greater amount of torque vs. size.

The internal coil winding slotless motor design has the opposite set of problems—the stator is extremely easy to design and manufacture vs. traditional slotted stators or external armature slotless stators, and the coils are much easier to wind. However, the inclusion of the coils on the interior of the stator requires the presence of a large air gap between the stator and rotor, greatly reducing efficiency and available power of this slotless design vs. traditional slotted motors by increasing the reluctance of the magnetic circuit formed between the magnetic elements present in the rotor and stator material. There are also obvious reliability and heating issues when considering a coil simply adhered to the wall of a stator, only millimeters away from a rapidly spinning rotor. There are alternative attachment methods; however, none eliminate the above efficiency decrease due to the increased air gap.

Thus, there is a definite need for a slotless BLDG motor/actuator design which is as easy to make as the internal coils designs, but retains the close tolerances and higher efficiencies of the external coils designs.

SUMMARY OF THE INVENTION

In a first aspect, the present invention provides in more generic terms a torque delivering apparatus, but in particular a slot-less BLDC type motor or rotary actuator, including: a stator having a ferromagnetic body with a plurality of exterior (flat) sides of even number forming a polygonal cross-section between a first and a second axial end, the stator body including a cylindrical bore extending between the first and second axial end and centred on a central axis of the stator; a rotor assembly having a cylindrical cross-section sized for rotation with small gap clearance within the cylindrical bore about the central axis, including at least one magnet and a shaft coupled to the magnet for rotation with the magnet about the central axis; and a plurality of solenoid coils, the number being half that of the even number of exterior sides of the stator, each coil including a plurality of windings extending around the stator along opposite ones of the plurality of exterior sides, each of the plurality of coils being configured to selectively receive current which generates a magnetic field in the stator that is applied to the rotor magnet such that the latter is subject to magnetic torque for rotating the rotor within the cylindrical bore to align with the magnetic field generated by the coils.

In a preferred embodiment of the above motor/actuator, the rotor is comprised of the shaft and one or more, diametrically polarized cylindrical permanent magnets, preferably of rare earth material type, such as NdFeB or SMCo. Preferably, the magnet(s) includes a keyed central opening configured to receive a key coupled to the shaft, which traverses the magnet(s), to cause the shaft to rotate with rotation of the magnet(s), thereby to provide torque output from the motor/actuator to an appliance mechanically coupled to the shaft outside the stator.

Preferably, the plurality of coils is configured to be energized (by a controller or otherwise) in sequential order to cause continuous rotary motion of the rotor within the stator. Thus, a BLDC servo motor can be implemented that can be used to deliver regulated continuous torque to an appliance connected to the shaft. Further, the controller can also be configured to selectively energize and fully de-energised (with backward or forward current-flow) by a controller for cogging the rotor into a limited number of positions and thus provide a stepper motor. Furthermore, a more sophisticated driver (controller) may be employed to proportionally control the power to the coils, allowing the rotor to position between the cog points and thereby rotate extremely smoothly. The skilled person will appreciate that motor/rotary actuator embodiments of the invention may be used in a vast area of applications, from small dimension stepper motor applications, to larger, electronically commutated DC motors with single or multi-phase coil windings and precise speed control for electric vehicular applications.

Advantageously, the motor/actuator further includes a first end cap coupled to the first end of the stator and a second end cap coupled to the second end of the stator, each of the first and second end caps having a polygonal footprint equal or similar to the cross-section of the stator body and including a crenelated polygonal wall with crenels arranged to receive and locate the plurality of coils as these wind about the end caps. Such end caps can be easily machined from suitable non-ferromagnetic stock materials, such as aluminium, or fine cast, and serve to secure the position of the coils on the stator, without separate bobbins.

The above-mentioned and other features and advantages of this invention, and the manner of implementing it, will become more apparent and the invention itself will be better understood by reference to the following description of a preferred embodiment of the invention provided with reference to the accompanying drawings.

DESCRIPTION OF PREFERRED EMBODIMENT

Figure 1:
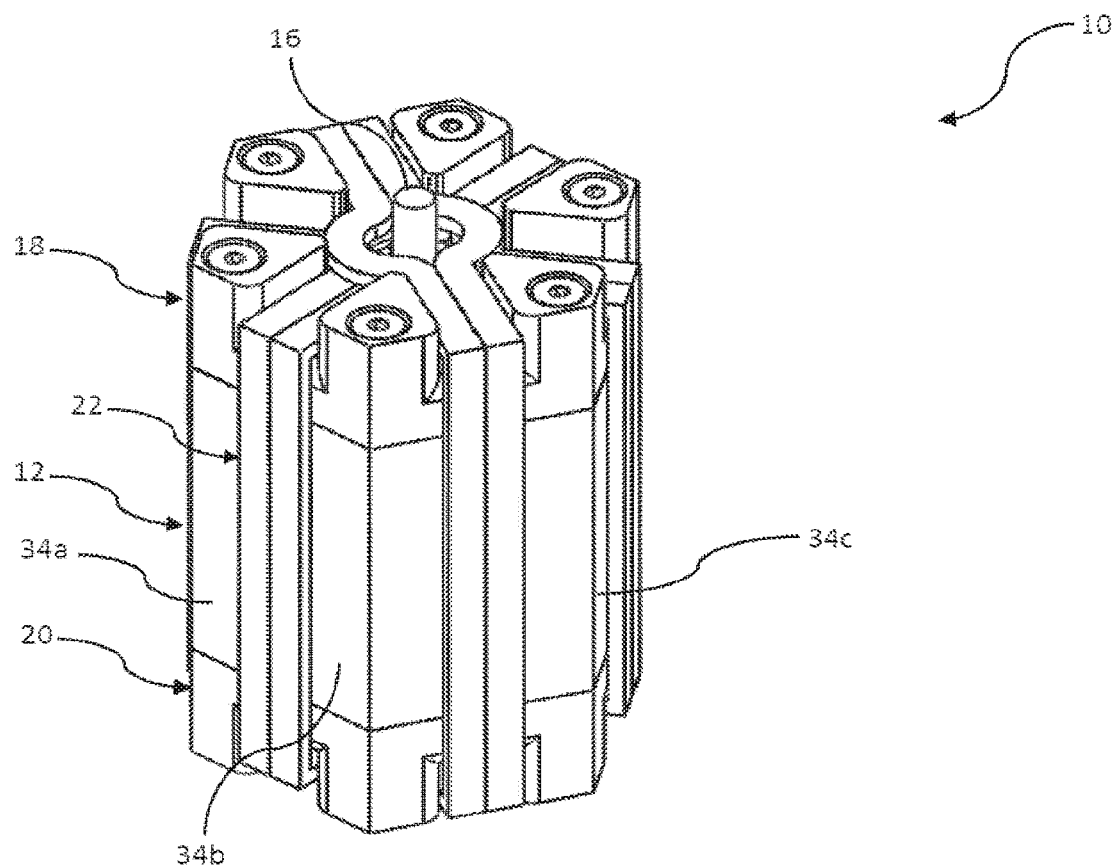
FIG. 1 is a perspective view of a motor/actuator embodiment of the present invention.

Corresponding reference characters indicate corresponding parts throughout the several Figures. The exemplifications set out herein illustrate exemplary embodiments of the invention and such exemplifications are not to be construed as limiting the scope of the invention.

Figure 2:
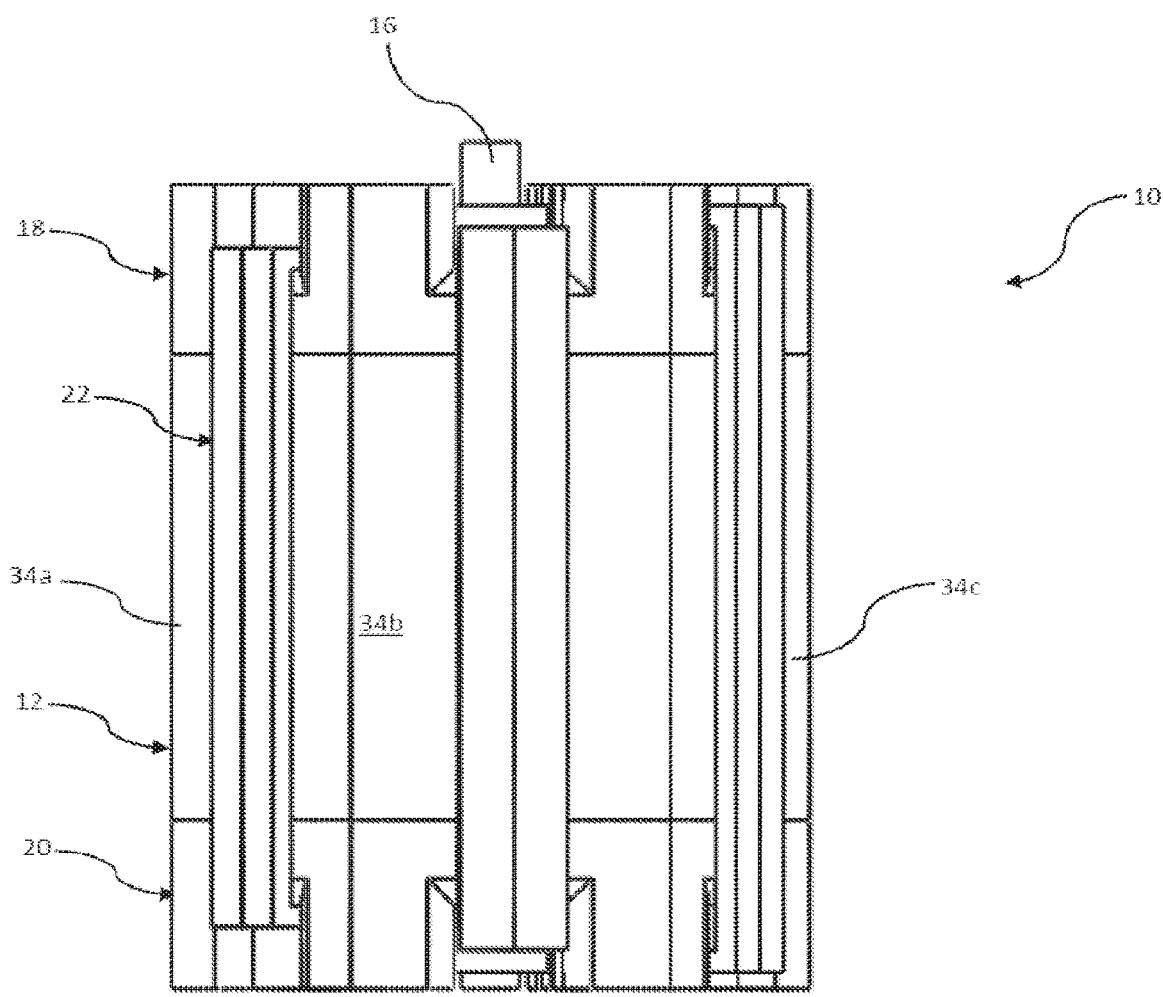
FIG. 2 is a side elevation of the motor/actuator of FIG. 1.
Figure 3:
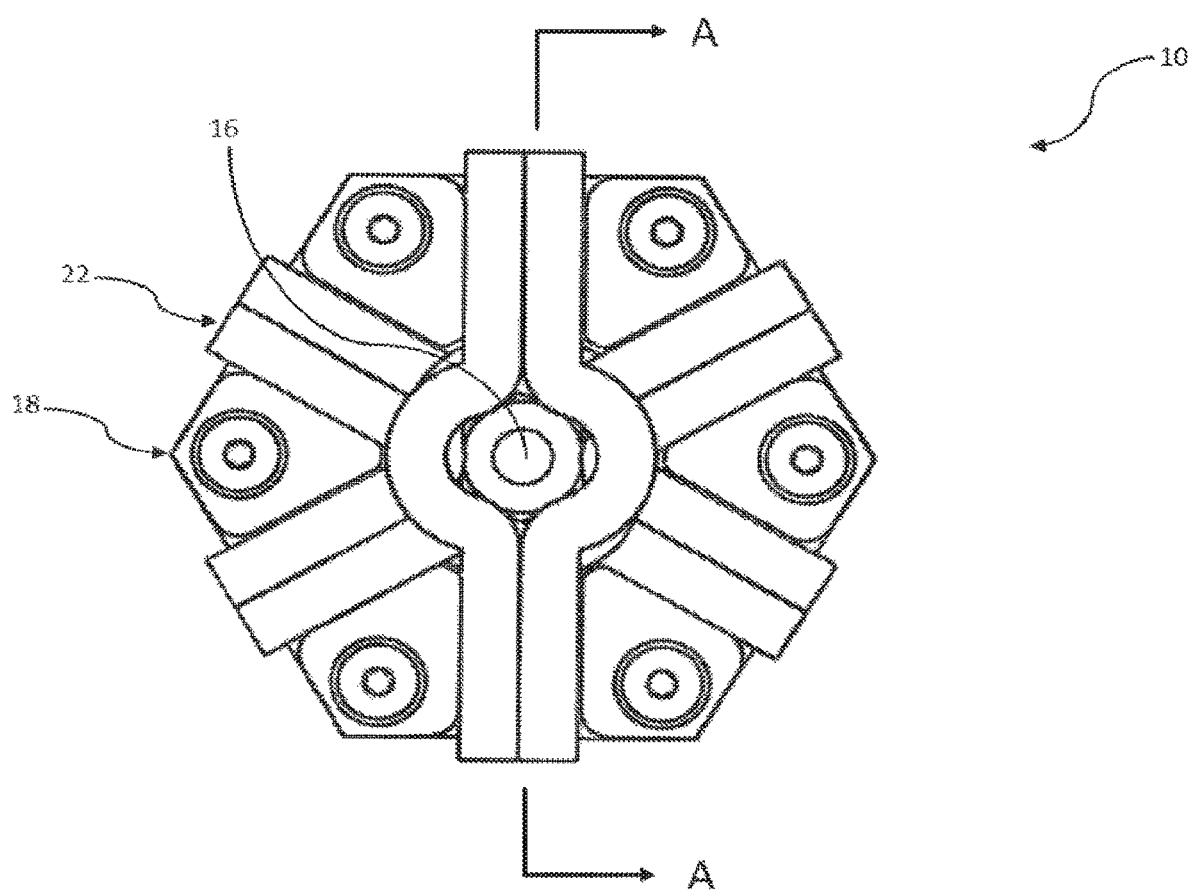
FIG. 3 is a top plan view of the motor/actuator of FIG. 1.

Referring now to FIGS. 1-3, a motor/actuator 10 according to one embodiment of the present invention generally includes a stator body 12, a rotor assembly 14 (FIGS. 4 and 5) including a shaft 16 and a permanent magnet 36, a first end cap 18, a second end cap 20, and three solenoid coils 22.

Stator 12 is formed as a hexagonal prism, with a regular polygonal cross-section of even order. Stator body 12 can be made from a variety of materials, including stacked laminations of electrical steel or similar material, concentric polygonal shells of a suitable amorphous ferromagnetic alloy, or machined from suitable ferromagnetic stock material.

Figure 4:
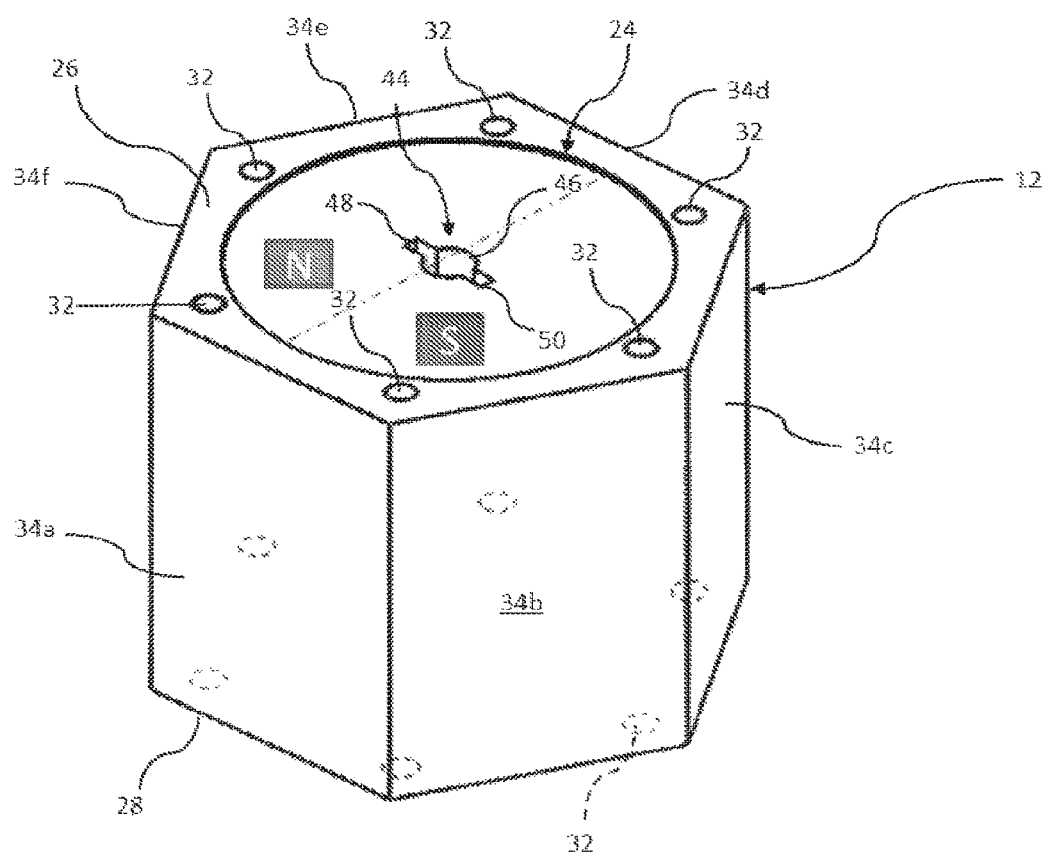
FIG. 4 is a perspective view of a stator and magnet according to one embodiment for use in the motor/actuator of FIG. 1.
Figure 5:
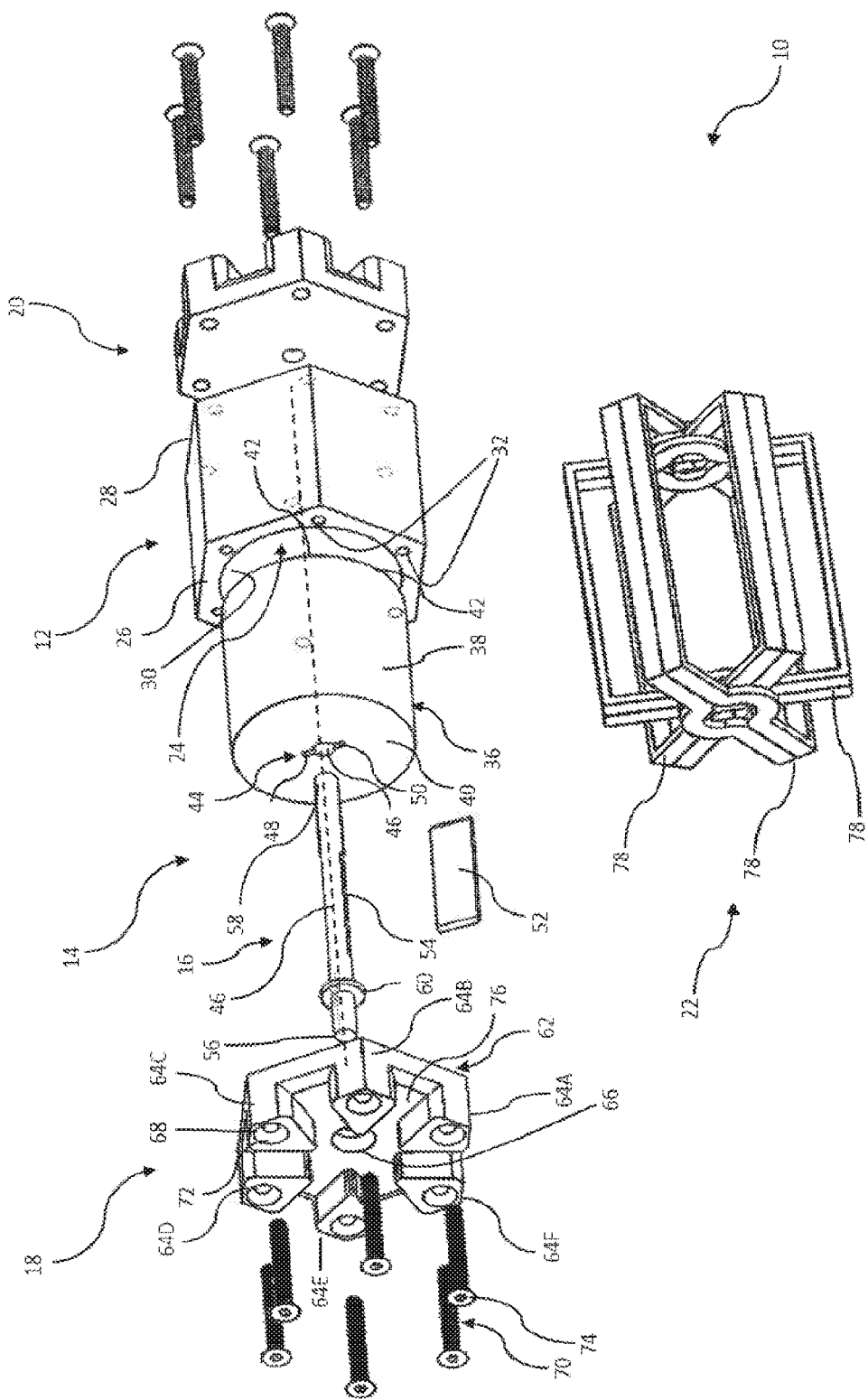
FIG. 5 is an exploded, perspective view of the motor/actuator of FIG. 1.
Figure 6:
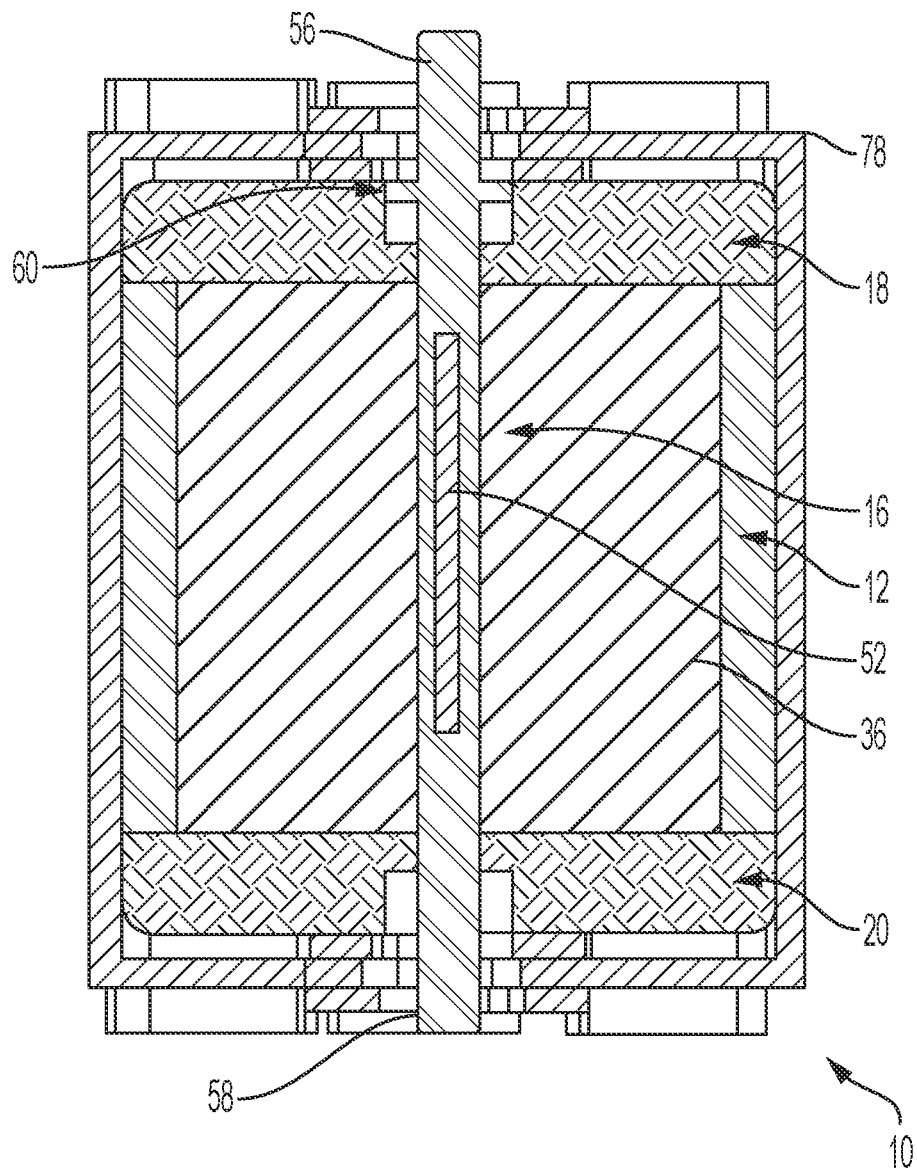
FIG. 6 is cross-sectional view of the motor/actuator of FIG. 1 taken along line A-A of FIG. 3.

As best shown in FIGS. 4 and 5, a cylindrical bore 24 is machined axially through stator body 12 from a first axial end face 26 to an opposite, second axial end face 28, perpendicular to both end faces 26, 28 and centred within stator 12. The inner surface 30 of bore 24 is, in one embodiment, polished to be smooth, and held to a close tolerance. Threaded holes 32 or similar fastening features are machined into both axial end faces 26, 28 of stator 12, located around bore 24, to provide mounting points for the end caps 18, 20, and optionally an external housing (not illustrated), to seal and protect stator 12 as is further described below.

In the embodiment shown, stator body 12 has six planar, exterior side faces 34A-F of equal size, sides for short. As best shown in FIG. 4, side 34A is parallel to and opposite of side 34D, side 34B is parallel to and opposite of side 34E and side 34C is parallel to and opposite of side 34F. While the hexagonal cross-section of stator body 12 provides six sides in this embodiment, it should be understood that more (but preferably not fewer) sides may define the periphery of stator body 12, as long as the overall number of exterior sides is even in number. That is, octagonal or decagonal cross-section stator bodies are also contemplated.

Referring now to FIGS. 4 and 5, rotor assembly 14 includes, apart from shaft 16, a single, cylindrical, diametrically polarized (dipole) permanent magnet 36, having an outer peripheral face 38, a first axial end face 40 and a second axial end face 42. The term diametrically polarised serves to denote a magnetic body in which a half-cylindrical N pole and a half-cylindrical S pole are separated by a diameter plane (as schematically represented by the chain line on the visible axial end face of magnet 36 in FIG. 4) extending between the opposite axial end faces 40, 42 of the magnet 36. A centred, keyed bore 44 extends along a central axis 46 of magnet 36 (and thus shaft 16 and stator 12) between the end faces 40, 42 of magnet 36, thereby allowing magnet 36 to be mechanically coupled to shaft 16 through its centre.

While not illustrated herein, magnet 36 may also be formed from one or more, diametrically magnetized hollow cylindrical shells, or several discrete magnet elements installed into a central rotor body by slots or some other method of direct attachment such as fasteners or adhesion. Equally, rather than having a single cylindrical permanent magnetic material body 36, a number of discrete cylindrical magnets (each with a keyed bore extending there through) may be mounted in sequence along the shaft 16. Alternatively, magnet 36 may be a composite body comprised of one (or more) rectangular, active permanent magnetic material body (or bodies) magnetised in a thickness direction thereof, with passive ferromagnetic material pole (extension) elements attached to the opposite mayor faces of the magnet, the pole elements shaped to form a cylinder about the centrally located active permanent magnetic material body (or bodies), whereby such rotor also has a N and a S pole at diametrically opposite sides of the centrally located active magnetic material. It should be understood also that multiple polarity magnets, eg quarto-poles, may be used.

Other magnet configurations may be employed with the rotor 14, consistent with the teachings of the present invention. Nonetheless, the preferred embodiment uses a single permanent magnetic material cylindrical body, as the most magnetically efficient arrangement, given that passive ferromagnetic pole extension materials add 'dead' weight to the rotor assembly 14 and decrease magnetic efficiency.

Cylindrical permanent magnet 36 is installed so that shaft 16 lies coaxial with central axis 46, a minimum air gap being present between the facing exterior cylindrical surface 38 of magnet 36 and inner cylindrical surface 30 of bore 24 of stator body 12. In one embodiment, magnet 36 lies completely within bore 24, but is sufficiently long such that its terminal end faces 40, 42 terminate very close to the end faces 26, 28 of stator 12, respectively.

Keyed bore 44 of magnet 36, in one embodiment, includes a cylindrical opening 46 and a pair of opposed slots 48, 50 extending into magnet 36 from terminal end 40. Slots 48, 50 are sized to receive a rectangular key 52 which fits within a slot 54 formed through shaft 16 to retain and fix the rotary position of magnet 36 with shaft 16. In one embodiment, shaft 16 consists of a non-magnetic material that runs through the centre of magnet 36, or has the required features to retain individual magnet elements by slots, fastening or adhesion.

Shaft 16 includes a first end 56, a second end 58, and a shoulder 60. Ends 56, 58 include any of a variety of bearing components (not shown) that cooperate with counter-bearing features/components secured in proximity about bore 66 of end caps 18, 20, or an external housing (not shown) to permit rotation of shaft 16 with magnet 36. Shoulder 60 engages with counter-bearing elements at an inward surface of end cap 18 to limit the extent to which shaft 16 extends through end cap assembly 18. As will be apparent to those skilled in the art, other configurations may be used to control the extent of shaft 16 as well as its rotation.

As indicated above, rotor assembly 14 is fixed relative to end caps 18, 20 so that magnet 36 may rotate within bore 24 of stator 12 in an axially defined position. Rotor assembly 14 will remain parallel with axis 46 through bore 24 to prevent contact between outer surface 38 of magnet 36 and inner surface 30 of bore 24. In addition, shaft 16 is appropriately locked against travel parallel, or into and out of bore 24, so that magnet 36 remains axially positioned within bore 24.

End caps 18, 20 are similar in construction. The interface between shaft 16 and end cap 18, 20 may differ somewhat in various embodiments depending upon how one of ordinary skill in the art may want to implement, in detail, the bearing components for shaft 16 at the respective end caps 18, 20. Nonetheless, given the external similarities, only end cap assembly 18 is described in detail herein.

End cap 18 comprises a base plate 62, hexagonal in plan view, with six integrally formed merlons (or cops, protrusions) 64A-F, extending perpendicularly from a mayor face of base plate 62, thereby resembling a hexagonal, crenelated wall standing proud from the base plate 62, with six identical crenels 76 between the cops 64A-F. As noted, base plate 62 has a central opening 66 configured to receive end 56 of shaft 16. Further, each protrusion (cop) 64A-F has a through hole 68, extending from the terminal top end into and through base plate 62, which aligns with a corresponding threaded hole 32 in the end face 26 of stator 12 when end cap 18 is mounted to stator 12. Through holes 68 are sized to receive fasteners 70 and include recesses 72 to receive the heads 74 of fasteners 72.

As noted, each pair of adjacent protrusions 64A-F form between them a crenel (channel) 76 that is positioned centrally relative to a corresponding side 34A-F of stator 12 when end cap 18 is mounted to stator 12. The crenels 76 of opposing pairs of protrusions 64A-F are aligned to facilitate winding and retention of coils 22 at stator body 12 as is further described below.

End cap base plate 62 and protrusions 64A-F are, in one embodiment, made of a nonmagnetic material such as aluminium, formed to match the cross section of stator body 12. Central opening 66 of base plate 62 may include additional counter bores and features on either side of base plate 62 to accommodate counter-bearing components, as has been alluded to above, for rotor shaft 16. These bearing components interface with the features machined on end 56 of shaft 16, fixing the axial position of magnet 36 relative to stator 12 but permitting free rotation of magnet 36 as indicated above.

Crenels 76 of end caps 18, 20 act as receptacles and guides for the set 22 of three (solenoid) coils 78, whereby courses of wire are wound around end caps 18, 20 to extend parallel to and in contact with the pairwise opposite sides 34*a*; 34*d*, 34*b*; 34*e* and 34*c*; 34*f* of stator body 12. Crenels 76 thus serve to secure and retain the coil set 22 on the outside of rotor body 12 with out additional fastening elements. It may be further noted that the six crenels 76 converge towards the centre of each end cap 18, 20. At this convergence location, the windings of coils 78 are routed to define an annular passage for end portion 56 of shaft 16 which protrudes end cap 18, 20 beyond central openings 66, for coupling with a torque receiving appliance or component.

As best shown in FIG. 5, coil set 22 includes, in this embodiment, three individual solenoid coils 78. As best shown in FIG. 1, each coil 78 is wrapped around both end caps 18, 20 and stator 12. Coils 78 are wound repeatedly from end cap 18 to end cap 20, around one set of parallel side faces 34A-F of stator 12. Coils 78 are routed through opposing crenels 76 on end cap 18, down the centreline of one side face 34A-F of stator 12, through the corresponding opposing crenels 76 on the axially opposite end cap 20, and up the centre of the opposite, parallel side face 34A-F of stator 12. By this positioning, a series of three, similar, rectangular coils 78 are wound around stator 12 and end caps 18, 20, radially and angularly symmetric about central axis 46 of stator 12. While the individual windings may be suitably isolated as in conventional electric motors, the rectangular coils 78 will come into contact with the stator's external planar faces 34A-F, thus improving coupling of the induced magnetic (B-) field into stator body 12, as noted below.

In order to operate the motor/actuator 10 described above, the skilled person will know that current is selectively applied to coils 78. The application of current to each of coils 78 induces a magnetic field (denoted B-field) within the volume enclosed by the relevant coil 78. As coils 78 are wrapped around the entire stator 12, the B-field also magnetizes stator 12 in a certain direction depending upon which of the three coils 78 is/are energised, and the direction of current flow within the energised coils. The magnetization of stator 12, in addition to the induced B-field of the coils 78, creates a magnetic torque on magnet 36 in bore 24, given that it is free to rotate, as long as the vector of the permanent magnetic field (denoted H-field) of the diametrically magnetised permanent magnet 36 is not aligned with the B-field vector of the energised coil 78, causing it to rotate with shaft 16 about axis 46 in seeking to align the H-field vector of the rotor 14 with the prevailing B-field vector of the stator coils 78.

As magnet 36 initiates rotation from a rest position, peripherally subsequent coil(s) 78 to the one used to initiate rotor rotation, may be energised sequentially, thus also changing direction of magnetisation of stator body 12. Thus, magnet 36 may be continually pulled along in rotation about axis 46 as the direction of magnetization of stator 12 is changed by charging the coil(s) 78 in a given sequence.

Coils 78 may be sequenced (i.e. energised) in a variety of ways—one coil 78 may be charged at a time, in rotational progression, causing continuous motion of magnet 36. Alternatively, coils 78 may be charged in opposite directions to boost the field within stator 12 and increase force upon magnet 36.

The skilled person is cognizant of various modes of energising the solenoid coils 78 in slot-less, brush-less DC motors, as well as controllers that may find use to achieve different modes of operation (eg as a rotary servo actuator, stepper motor, etc.) and for further detail the person skilled in the art is directed to relevant standard literature.

While this invention has been described with reference to an exemplary design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A torque delivering apparatus, including:
    a stator body including an interior extending between the opposite axial ends;
    a rotor assembly sized for rotation within the interior of the stator body about a central axis and including at least one permanent magnet; and
    a plurality of solenoid coils, each coil having a plurality of windings and routed to have sections extending parallel to the central axis and sections extending across both the axial ends of the stator body such that each coil surrounds axial and longitudinal sides of the at least one permanent magnet, a first coil being angled relative to a second coil about the central axis; wherein each of the plurality of coils is configured to selectively and independently receive current and generate a magnetic field in the stator that is applied to the rotor magnet, the rotor being subject to magnetic torque within the interior of the stator body for rotating and aligning the magnetic field of the permanent magnet with the generated magnetic field.

2. The torque delivering apparatus of claim 1, wherein the at least one permanent magnet is a diametrically magnetized permanent magnet.

3. The torque delivering apparatus of claim 1 wherein the plurality of windings of each of the plurality of solenoid coils is routed to define an annular passage for an end portion of the rotor assembly.

4. A torque delivering apparatus, including:
    a stator having an interior;
    a rotor assembly sized for rotation about a longitudinal axis of the stator within the interior of the stator and including at least one permanent magnet; and
    a plurality of solenoid coils, each coil having a plurality of windings and routed to have sections extending such that each coil surrounds axial and longitudinal sides of the at least one permanent magnet, a first coil being angled relative to a second coil about the longitudinal axis, wherein each of the plurality of coils is configured to selectively and independently receive current and generate a magnetic field in the stator that is applied to the permanent magnet of the rotor, the rotor being subject to magnetic torque within the stator for rotating and aligning the magnetic field of the permanent magnet with the generated magnetic field.

5. The torque delivering apparatus of claim 4, wherein a first solenoid coil of the plurality of solenoid coils extends along a first longitudinal side of the permanent magnet from a first axial end of the permanent magnet to a second axial end of the permanent magnet, across the second axial end of the permanent magnet, along a second longitudinal side of the permanent magnet from the second axial end of the permanent magnet to the first axial end of the permanent magnet, and across the first axial end of the permanent magnet.

6. The torque delivering apparatus of claim 5, wherein the stator includes a stator body and the first solenoid coil of the plurality of solenoid coils are stationary relative to the stator body while the rotor assembly rotates about the longitudinal axis of the stator.

7. The torque delivering apparatus of claim 4, wherein the stator includes a stator body and the plurality of solenoid coils are stationary relative to the stator body while the rotor assembly rotates about the longitudinal axis of the stator.

* * * * *